United States Patent [19]

Lee

[11] Patent Number: 5,752,749
[45] Date of Patent: May 19, 1998

[54] ANTI-LOCK BRAKE SYSTEM FOR VEHICLE

[75] Inventor: Sang-Chul Lee, Kyonggi-Do, Rep. of Korea

[73] Assignee: Mando Machinery Corporation, Kyonggi-Do, Rep. of Korea

[21] Appl. No.: 602,099

[22] Filed: Feb. 15, 1996

[30] Foreign Application Priority Data

Jun. 26, 1995 [KR] Rep. of Korea ............... 95-17622
Jun. 26, 1995 [KR] Rep. of Korea ............... 95-17623

[51] Int. Cl.$^6$ .................................................... B60T 8/42
[52] U.S. Cl. ........................... 303/115.2; 303/113.1; 303/116.1
[58] Field of Search ............... 303/125.2, 119.2, 303/113.1, 115.1

[56] References Cited

U.S. PATENT DOCUMENTS

| | | | |
|---|---|---|---|
| 2,212,872 | 8/1940 | Barker. | |
| 3,231,315 | 1/1966 | Turnbull | 303/115.2 |
| 3,909,073 | 9/1975 | de Gennes | 303/115.2 |
| 4,152,030 | 5/1979 | Blomberg et al. | 303/115.2 |
| 4,714,300 | 12/1987 | Heess et al. . | |
| 4,746,172 | 5/1988 | Gath et al. | 303/119.2 |
| 4,809,890 | 3/1989 | Leiber | 303/119.2 |
| 4,953,918 | 9/1990 | Hasida et al. . | |
| 5,029,950 | 7/1991 | Vennemeyer et al. . | |
| 5,286,102 | 2/1994 | Nakamura | 303/115.2 |

Primary Examiner—Mathew C. Graham
Attorney, Agent, or Firm—Bryan Cave LLP

[57] ABSTRACT

An improved anti-lock brake system for a vehicle includes an open-type hydraulic valve, a closed-type hydraulic valve, an operational liquid storing apparatus, and a solenoid pump. The open-type solenoid valves supply a braking force generated at the master cylinder to the brake wheel cylinders. The closed-type solenoid valves lock the pressure of the brake wheel cylinders and operate to decompress the wheel cylinders. Decompressing orifices determine a decompressing level for the brake wheel cylinders. The liquid storing apparatus stores liquid introduced thereto from the decompressing orifices. The solenoid pumps supply the liquid stored in the liquid storing apparatuses to the brake wheel cylinders to generate a braking force at the wheel cylinders.

19 Claims, 9 Drawing Sheets

1

ANTI-LOCK BRAKE SYSTEM FOR VEHICLE

BACKGROUND OF THE INVENTION

1. Field of the Invention

The present invention relates to an anti-lock brake system (ABS), and particularly to an improved ABS by which a malfunctioning element of the system may be more easily changed. The system includes an open-type hydraulic valve, a closed-type hydraulic valve, an operational liquid storing apparatus, and a solenoid pump which generates an anti-lock braking force. Electrical power consumption of the ABS system is reduced and reliability of the system increased.

2. Description of the Conventional Art

When braking a vehicle, the wheels of the vehicle may lock due to improper braking contact between the tires and ground. When the wheels of the vehicle lock due to an over-braking force applied to the wheels, an anti-lock brake system (ABS) may be used to gradually reduce the braking force to a proper level, and to increase the braking force to a proper level thereafter.

The ABS maintains, reduces and increases the wheel brake force using an electronic control unit (ECU) which compares the number of rotations of each wheel, which is sensed by a wheel speed sensor, with the speed of the vehicle, which is detected by a vehicle speed sensor.

As shown in FIG. 1, U.S. Pat. No. 2,212,872 discloses a conventional anti-lock brake system, which includes a reservoir 102 disposed at a tandem master cylinder 100 connected to a vacuum booster, brake lines 105a, and 105b of brake wheel cylinders 104, 104a, 104b, 104c, and 104d and open-type charging valves 106a and 106b. Each brake wheel cylinder 104 is connected to a closed-type discharging valve 107a and 107b, and the closed-type discharging valves 107a and 107b are connected to return lines 110a and 110b connected to suction chambers 109a and 109b through connection ports 108a and 108b.

The brake wheel cylinder 104 generates a braking force in proportion to the force which is applied to the tandem master cylinder 100 through the brake lines 105a and 105b, the returning lines 110a and 110b, and the open-type charging valves 106a and 106b. Here, the pump P is not in operation, and the closed-type discharging valves 107a and 107b are kept in a closed state.

During the operation of the brake wheel cylinder 104 when a wheel locking phenomenon occurs, the discharging valves 107a and 107b are opened in a very short time in response to the locking phenomenon of the wheel so as to decrease the pressure of the brake, and at the same time, the pump P is operated.

The supply of the compressed liquid transferred from the pump P for controlling the pressure of the brake wheel cylinder 104 is continued until the locking and unlocking of the wheel is completed.

When the pressure of the brake wheel cylinder 104 is being controlled, the opening operation of the closed-type discharging valves 107a and 107b and the operation of the opened pump P occur at the same time, and a certain amount of the compressed liquid is introduced into the suction chambers 109a and 109b through the return lines 110a and 110b.

Since the conventional ABS includes pressure lines 112a and 112b between the pressure valve of the hydraulic pump P and the wheel cylinder 104, which are directly connected to the tandem master cylinder 100, when pressure is not applied to the brake wheel cylinder 104 due to the operation of the open-type charging valves 106a and 106b during the pressure control process for unlocking the abrupt locking of the wheel, since the liquid discharged from the pump P is returned to the reservoir 102 through the tandem master cylinder 100, vibrations are transferred to the brake pedal of the vehicle, so that driver feels discomfort.

In addition, when the pump needs to maintain constant locking pressure of the brake wheel cylinder 104, the driving shaft of the pump is continuously operated along with the driving motor for the driving shaft, thereby increasing power consumption.

When at least one of the brake wheel cylinders 104a, 104b, 104c and 104d is locked, the pump is being operated, so that liquid is additionally discharged. In addition, since the discharging pressure of the pump is being applied to the remaining three brake wheel cylinders, in which locking does not occur, the desired vehicular safety benefit is not achieved, and the braking distance of the vehicle increases.

In addition, since the conventional ABS for a vehicle includes suction lines 11a and 11b connected to the reservoir 102 of the pump P and return lines 110a and 110b connected to the closed-type discharging valves 107a and 107b, it is difficult to provide space for the engine due to the piping adjacent to pump P.

As shown in FIG. 2, U.S. Pat. No. 4,714,300 discloses a solenoid pump P in another conventional ABS which includes a solenoid coil 201 disposed at the inside of a housing 200, a permanent magnet 203 fixed to the outer surface of an armature 202, elastic members 204a and 204b having an elastic force and disposed at both sides of the armature 202. The pumping operation is performed as a ball of a single directional check valve 206 closes or opens an inner path 202a of the armature 202 when the armature 202 moves in the left or right direction or in the upward or downward direction within the housing 200 when varying the polarity of the current of the solenoid coil 201.

In this solenoid pump, since the driving source is obtained by the permanent magnet 203 disposed at a periphery of the armature 202 when the polarity of the current of the solenoid coil 201 is changed, when the permanent magnet 203 is exposed to magnetic flux having the opposite polarity, the magnetic force of the permanent magnet is reduced, so that desired performance of the system can not be achieved. In addition, the polarity change of the current applied to the solenoid coil 201 is disadvantageously resonated together with the elastic members 204a and 204b.

Moreover, since the single directional check valve 206 is disposed at the armature 202, the pulse of the pressure of the discharging port may be increased when the liquid is charged or discharged. In addition, the volume of the side of the discharging port 205b is expanded in accordance with the movement of the armature 202, so that there is a certain limitation for increasing the pressure at the side of the discharging port.

When the pressure difference between the discharging port 205b and the charging port 204a is large, the operation of the armature 202 when the elastic member 204b is expanded is not performed at a desired speed.

In addition, since the volume at the side of the discharging port 205b is periodically varied, the pressure increase is not achieved by the discharge of the liquid. The pressure at the side of the charging port 205b is varied.

SUMMARY OF THE INVENTION

Accordingly, it is an object of the present invention to provide an anti-lock brake system for a vehicle, which overcomes the problems encountered in conventional anti-lock systems.

It is another object of the present invention to provide an improved anti-lock brake system for a vehicle by which a malfunctioning element can be more easily changed and maintained. The system includes an open-type hydraulic valve, a closed-type hydraulic valve, an operational liquid storing apparatus, and a solenoid pump which serves to generate an anti-lock braking force. Electrical power consumption may be advantageously decreased and reliability of the product increased through reduced operation of the solenoid pump.

To achieve the above objects, there is provided an anti-lock brake system which includes master cylinders and brake wheel cylinders that are driven in cooperation with a vacuum/hydraulic booster; open-type solenoid valves for supplying an anti-lock braking force generated by the master cylinders to the brake wheel cylinders; close-type solenoid valves for locking the pressure of the brake wheel cylinders, the close-type solenoids being operated when decompressing; decompressing orifices for determining a decompressing level of the close-type solenoid valves from the brake wheel cylinders; liquid storing apparatuses for storing liquid introduced thereto from the decompressing orifices; and solenoid pumps for supplying the liquid stored in the liquid storing apparatuses to the brake wheel cylinders and for generating a locking force. The anti-lock brake system according to the present invention enhances the reliability of the braking operation and reduces the power consumption by discharging liquid to the master cylinder using pressure of the liquid storing apparatus without operation of a pump.

In addition, the anti-lock brake system according to the present invention provides an improved anti-lock brake system so as to obtain a desired braking force when a wheel receives a locking force while an over locking pressure is applied to the system.

The anti-lock brake system for a vehicle according to the present invention is directed to minimizing the power consumption by providing a single element which has the function of the pump for drawing/discharging liquid in cooperation with the reciprocating force of the armature by means of the solenoid coil by providing a spring supporting the armature with an elastic force greater than that of the spring supporting the piston.

The anti-lock brake system for a vehicle according to the present invention is directed to manufacturing the product in an easier method for reducing the delay time of braking because the system does not include an additional orifice for controlling the pressure of the open type solenoid.

In addition, the anti-lock brake system for a vehicle according to the present invention reduces power consumption because to reducing the pressure of the brake wheel cylinder, unnecessary liquid is not discharged, but is directed to a liquid storing apparatus. The system reduces manufacturing costs because it does not require an additional element to prevent vibration because the open-type solenoid is disposed between the brake wheel cylinder and the master cylinder.

Moreover, the anti-lock brake system for a vehicle according to the present invention improves the reliability of the product and reduces power consumption by discharging the liquid to the master cylinder using the pressure of the liquid without the operation of the solenoid pump when the wheel-lock prevention operation is completed.

DETAILED DESCRIPTION OF THE INVENTION

Figure 1:
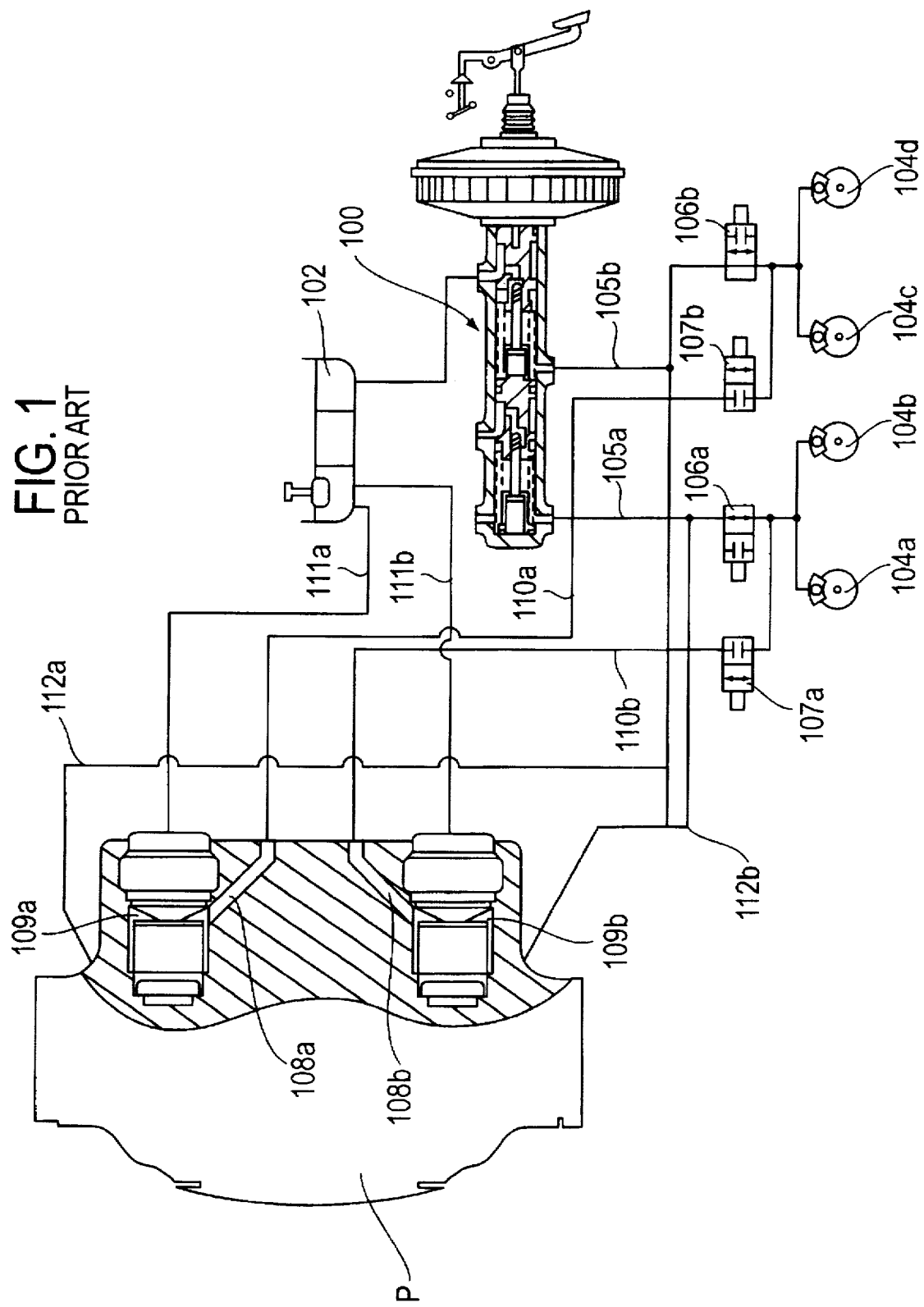
FIG. 1 is a schematic view showing the hydraulic circuit of a conventional ABS.
Figure 2:
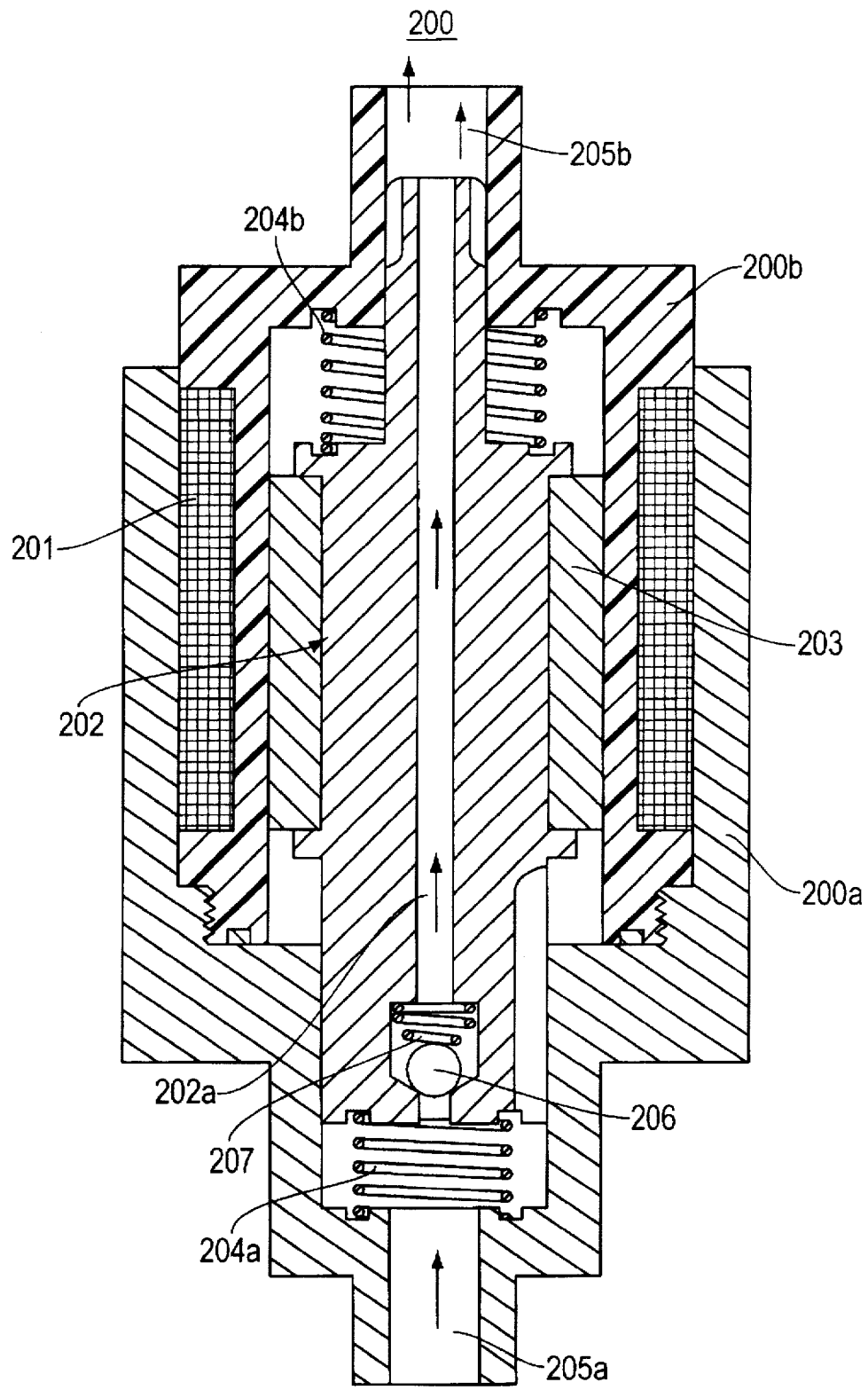
FIG. 2 is a cross-sectional view showing a conventional solenoid pump.
Figure 3:
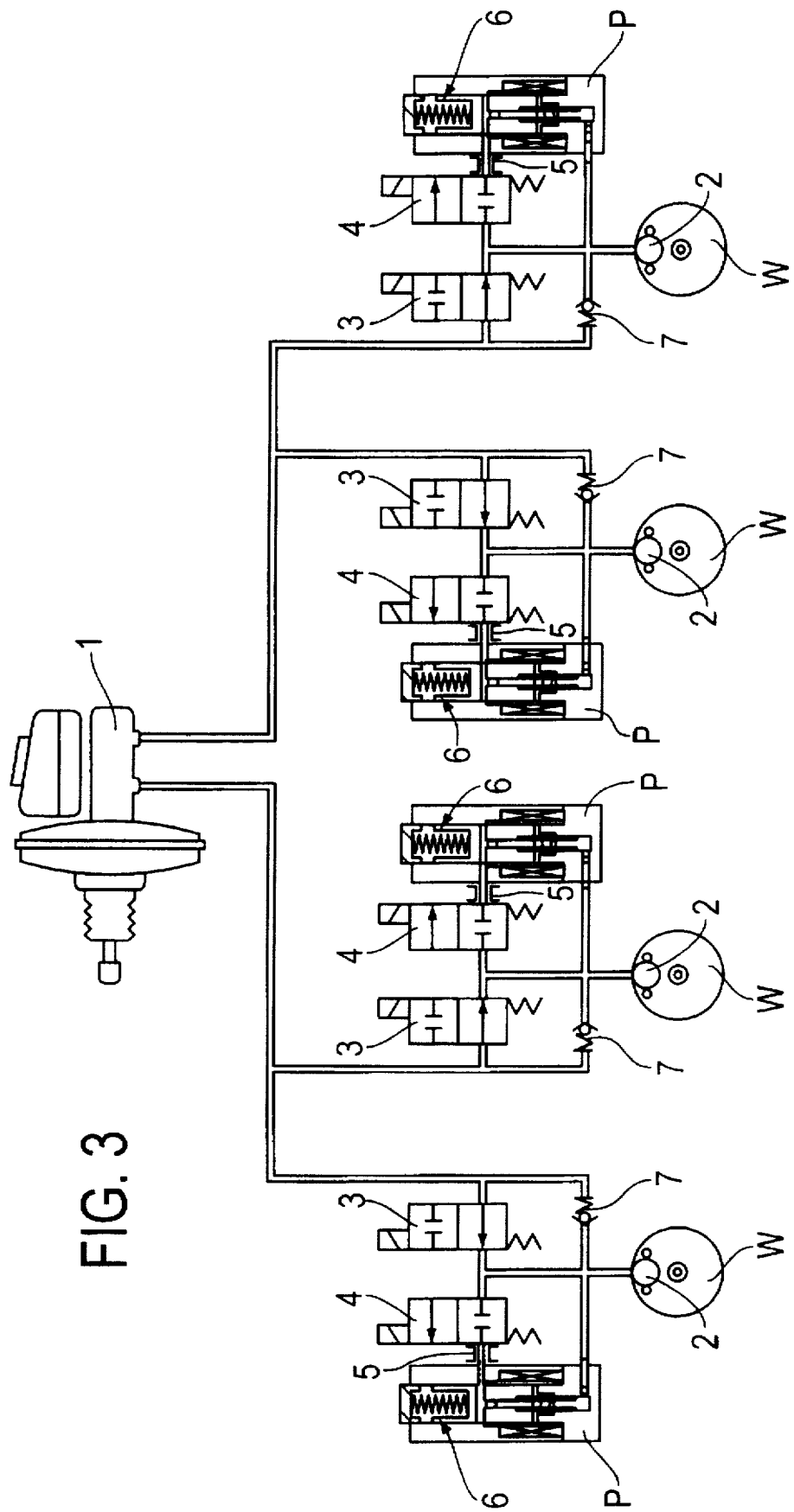
FIG. 3 is a schematic view showing the hydraulic circuit of the ABS of the present invention.

FIG. 3 shows a hydraulic circuit of an ABS for a vehicle according to the present invention which includes a master cylinder 1 and a brake wheel cylinder 2 which are operated in cooperation with a booster, an open-type solenoid valve 3 for supplying an anti-lock braking force generated by the master cylinder 1, a closed-type solenoid valve 4 operated when the pressure is decreased for always blocking the pressure of the brake wheel cylinder 2, a decompressing orifice 5 for controlling the decompressing level of the brake wheel cylinders 2 and the open-type solenoid valves 4, a storing apparatus 6 for storing liquid introduced thereto from the decompressing orifice 5, and a solenoid pump P for supplying the liquid stored in the liquid storing apparatus 6 to the brake wheel cylinder 2 for providing an anti-lock braking force.

With the above-mentioned construction, the anti-lock braking system according to the present invention is directed to slowing down a vehicle by supplying an anti-lock force to each wheel from each brake wheel cylinder 2 through the open-type solenoid valve 3.

When the surface of road is slippery or when an over-braking force is applied to the brake wheel cylinder 2, wheel-lock is detected by a sensor (not shown) disposed at the wheel W. When this occurs, a controller (not shown) inputs an electrical signal to the open-type solenoid valve 3 of the locked wheel, so that the liquid supplied from the master cylinder 1 is blocked.

When the closed-type solenoid valve 4 of the locked wheel is opened, the liquid in the brake wheel cylinder 2 is introduced into the liquid storing apparatus 6 through the decompressing orifice 5, and pressure in the brake wheel cylinder 2 is decreased, so that the wheel W is unlocked.

When the wheel is unlocked, and the wheel is moving again, the controller turns off the electrical signal to the closed-type solenoid valve 4, enabling the solenoid valve 4 to move to a locked position, and applies an electrical signal to the solenoid pump P so as to discharge the liquid contained in the liquid storing apparatus 6 and to supply the liquid to the brake wheel cylinder so as to increase the pressure on the wheel cylinder. If necessary, the increase in the locking pressure may be stopped.

Figure 4:
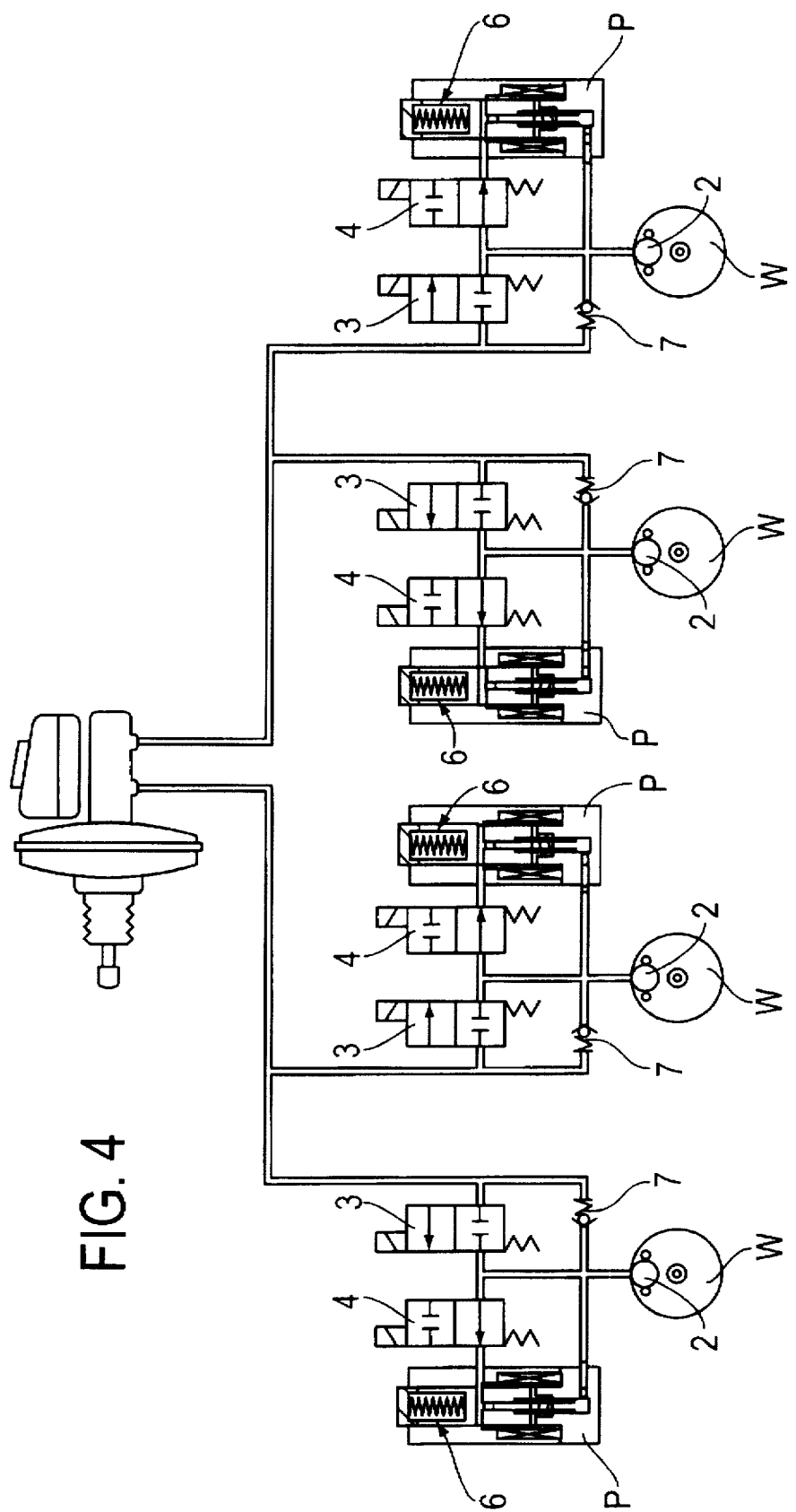
FIG. 4 is a schematic view showing an operational state of the ABS of the present invention.

In addition, as shown in FIG. 4, an electrical signal may be inputted to the open-type solenoid valve 3, so that the open-type solenoid valve 3 is in a closed position. Also, if no electrical signal is supplied to the closed-type solenoid valve 4, so that the closed-type solenoid valve 4 is in a closed position and if no electrical signal is supplied to the solenoid pump P, brake wheel cylinder 2 will not receive any pressurized liquid, and pressure will be maintained in the brake wheel cylinder 2.

When a driver unlocks the locking operation of the system, i.e., reduces pressure on the brake pedal, the pressure of the master cylinder 1 is decreased. The single direction check valve 7, which is positioned at the same line as the brake, is opened by the pressure difference between each side thereof. The liquid from the brake wheel cylinder 2 returns to the master cylinder 1 through the single direction check valve 7, and the pressure of the brake wheel cylinder 2 is released.

Thus, when a driver unlocks the brake while the sliding prevention mode is in operation, the liquid stored in the liquid storing apparatus 6 is supplied to the master cylinder 1 through the single direction check valve 7.

The ABS according to the present invention avoids the space limitations of the engine compartment by providing the open type solenoid valve 3, the closed-type solenoid valve 4, the liquid storing apparatus 6, and the solenoid pump P at each wheel W.

In addition, since the above-mentioned elements according to the present invention are provided at each wheel W, compatibility with existing brake systems is good, and changing malfunctioning parts can be easily performed, so that it is easy to maintain and diagnose the system.

Moreover, since an additional orifice is not provided for controlling the increase of the pressure of the open-type solenoid valve 3, it is possible to reduce the delay time for resuming normal brake operation, and it is easy to manufacture the solenoid valve.

Since there is no unnecessary liquid discharge which occurs when the liquid is discharged using the solenoid pump P, power consumption can be decreased, and when expanding the capacity of the liquid storing apparatus 6, it is possible to decompress the brake wheel cylinder 2 even in a state in which the liquid is not discharged.

When the sliding prevention operation is completed in a state in which the liquid remains in the liquid storing apparatus 6 and the brake is unlocked, since it is possible to discharge the stored liquid to the master cylinder 1 without using the solenoid pump P, the system decreases power consumption, and product reliability can be increased.

Figure 5:
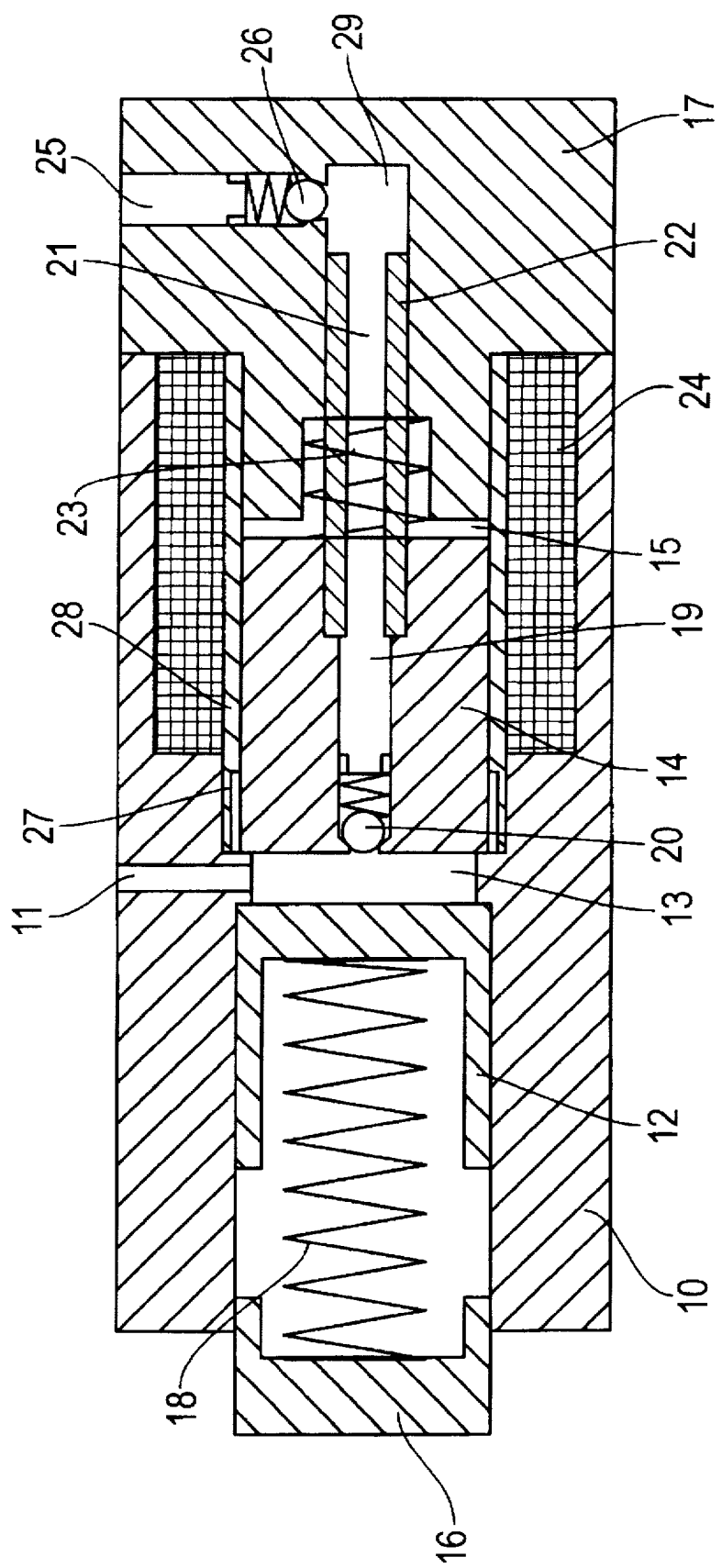
FIG. 5 is a cross-sectional view showing a solenoid pump of the ABS of the present invention.

As shown in FIG. 5, the solenoid pump P includes an inlet port 11 formed in the housing 10 for introducing liquid from the brake wheel cylinder 2, a liquid suction chamber 13 inserted into a piston 12 as the side of the inlet port 11, a compressing chamber 15 in which the liquid suction chamber 13 and the armature 14 are provided, a piston 12 inserted into the interior of the compressing chamber 15, a cap 16 for restricting the movement of the armature 14, and a yoke 17.

The piston 12 is disposed in the suction chamber 13 formed at one side of the housing 10 of the solenoid pump P, and includes a spring 18 disposed between the piston 12 and the cap 16 so that the rear portion thereof can receive elastic force from the spring 18.

A passing-through path 19 is formed at the central portion of the interior of the armature 14 which is disposed in the compressing chamber 15 of the solenoid pump P. A single direction check valve 20 is disposed at one end thereof for blocking the passing-through path 19, and a plunger 22 having a flowing path 21 communicating with the passing-through path 19 is provided at the other end thereof.

The spring 23 is placed in the yoke 17 of the plunger 22 so that one end of the armature 14 can receive the elastic force of the spring 23. The solenoid coil 24 forming a magnetic field at the armature 14 is fixed to the inner surface of the compressing chamber 15. A discharging port 25 communicating with the brake wheel cylinder is formed at the yoke 17 engaged to the housing 10, so that liquid which flows to the compressing chamber 15 from the liquid suction chamber 13 can flow to the brake wheel cylinder. A single direction check valve 26 is disposed at the yoke 17, in which the discharging port 25 is formed, for blocking liquid from flowing to the discharging port 25.

A bearing 27 is provided at the outer surface of the armature 14 disposed in the compressing chamber 15 for guiding the movement of the armature 14, and a leakage prevention tube 28 is engaged to the yoke 17 for preventing the leakage of the liquid.

With the above-mentioned construction, the cap 16 of the housing 10 serves to discharge the compressed air in accordance with the movement of the piston 12 so as to prevent the suction of dust or foreign substances. The elastic force of the spring 23 elastically supporting the armature is greater than that of the spring 18 supporting the piston 12, so that the armature 14 does not move due to the pressure of the liquid introduced into the suction chamber 13 through the inlet port 11. The elastic force of the supporting spring disposed at the charging side of the single direction check valve 20 and the elastic force of the supporting spring disposed at the discharging side of the single direction check valve 26 are the same.

Figure 6:
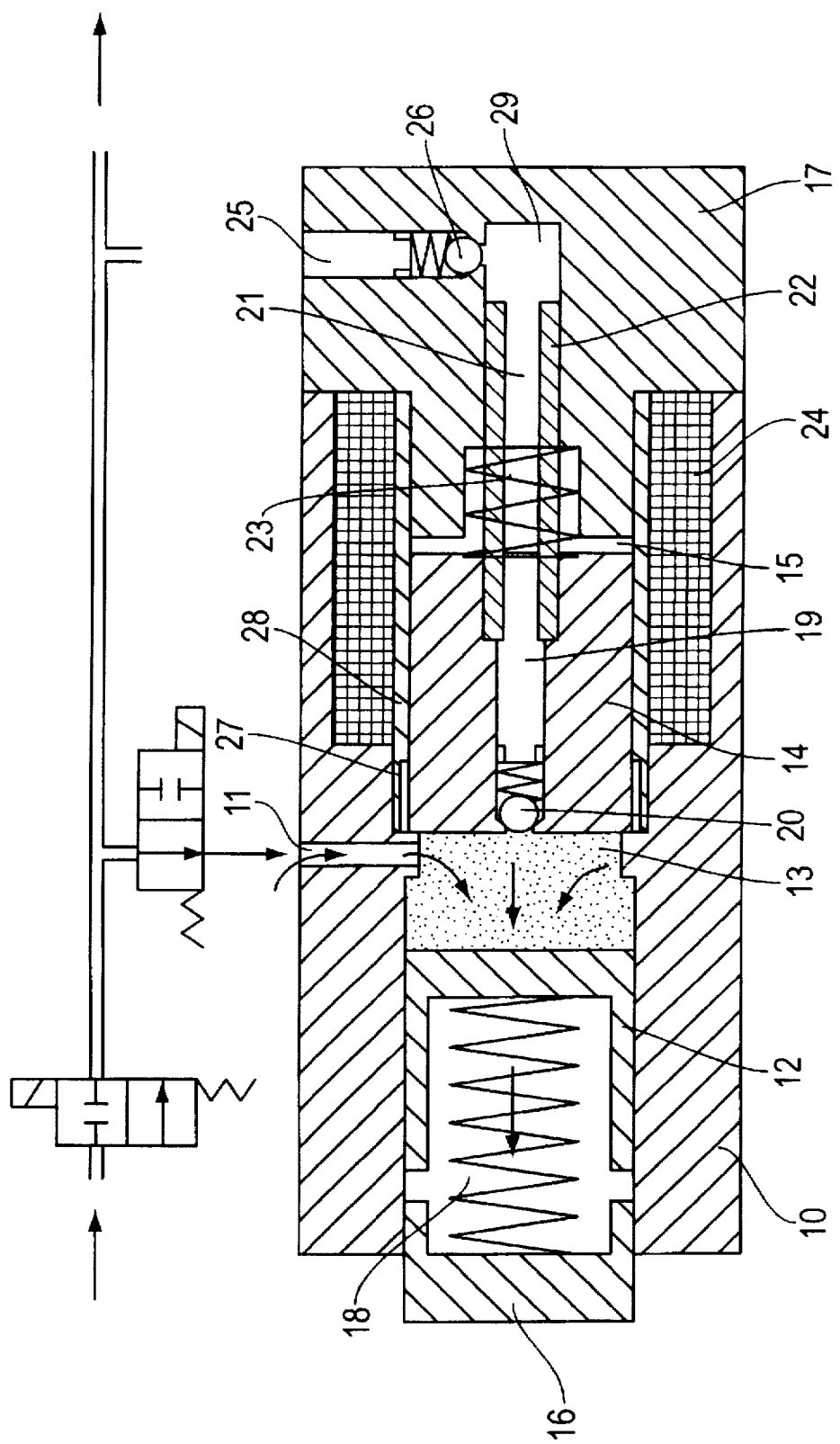
FIG. 6 is a cross-sectional view showing operation of the solenoid pump in accordance with the invention.

When the wheel skids due to an over-braking force applied to the wheel, the sensor disposed at each wheel detects the sliding state and outputs a signal to the controller so as to unlock the pressure applied to the brake wheel cylinder. Thereafter, as shown in FIG. 6, the liquid is introduced into the suction chamber 13 through the inlet port 11 from the brake wheel cylinder, and the piston 12 overcomes the elastic force of the spring 18 due to the pressure of the liquid applied thereto from the suction chamber 13 and moves to the position of the cap 16. At this time, the elastic force supporting the armature 14 is greater than that of the spring 18 supporting the piston 12, so that the armature 14 does not move.

The liquid from the brake wheel cylinder flows through the inlet port 11 into the suction chamber 13, and the pressure of the brake wheel cylinder is decreased.

Figure 7:
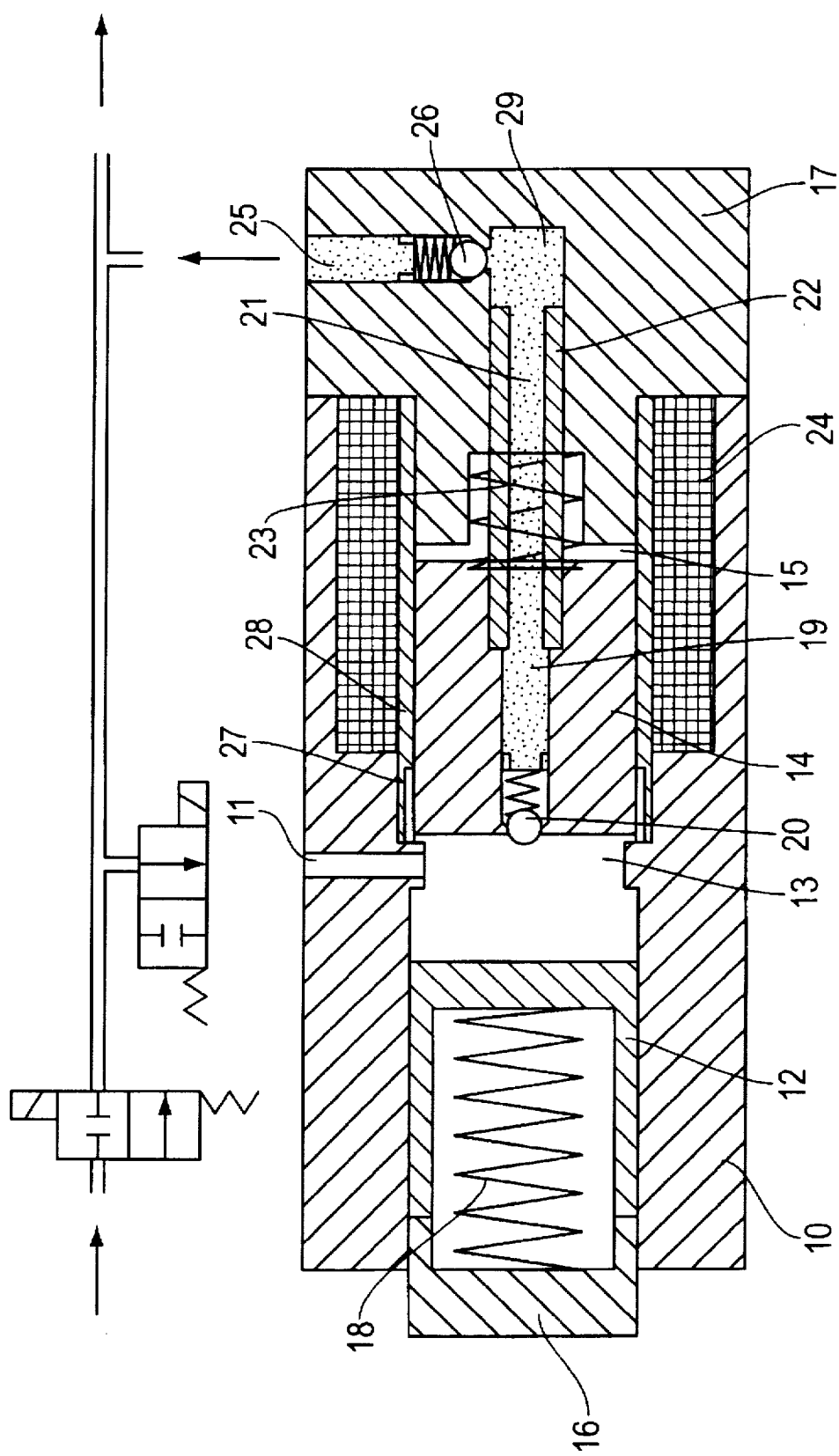
FIG. 7 is a cross-sectional view showing operation of the solenoid pump in accordance with the invention.

As shown in FIG. 7, when it is necessary to supply a locking force so as to lock the wheel due to the friction between the surface of the ground and the tire, the controller blocks the inlet port 11 and applies an electrical signal to the solenoid coil 24 which forms a magnetic field, causing the armature 14 disposed at the side of the compressing chamber 15 to move toward yoke 17. At this time, although the armature 14 returns, the passing-through path 19 of the armature 14 is not opened, and the liquid at the side of the compressing chamber 15 is not leaked because the ball of the single direction check valve 20 blocks the valve seat.

Figure 9:
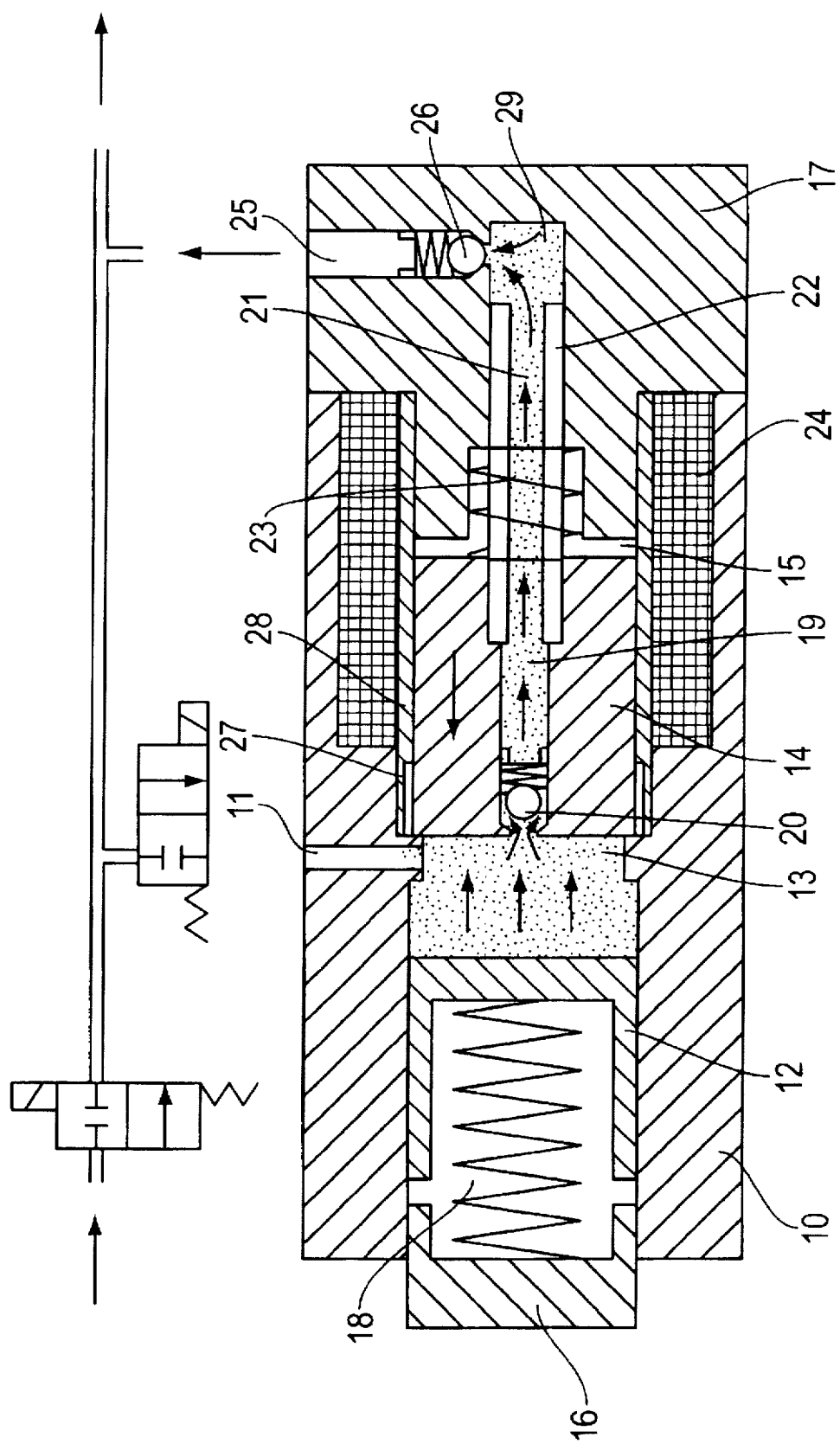
FIG. 9 is a cross-sectional view showing operation of the solenoid pump in accordance with the invention.

When the elastic force is not applied to the solenoid coil 24, the armature 14, as shown in FIG. 9, moves to the side of the suction chamber 13 in cooperation with the recovering force of the spring 23. Since the plunger 22 connected with the armature 14 comes back to the interior of the yoke 17, the volume of the compressing chamber 15 is reduced, and at the same time the liquid filled in the flowing path 29 of the yoke 17 is compressed, and the pressure of the liquid is increased.

Figure 8:
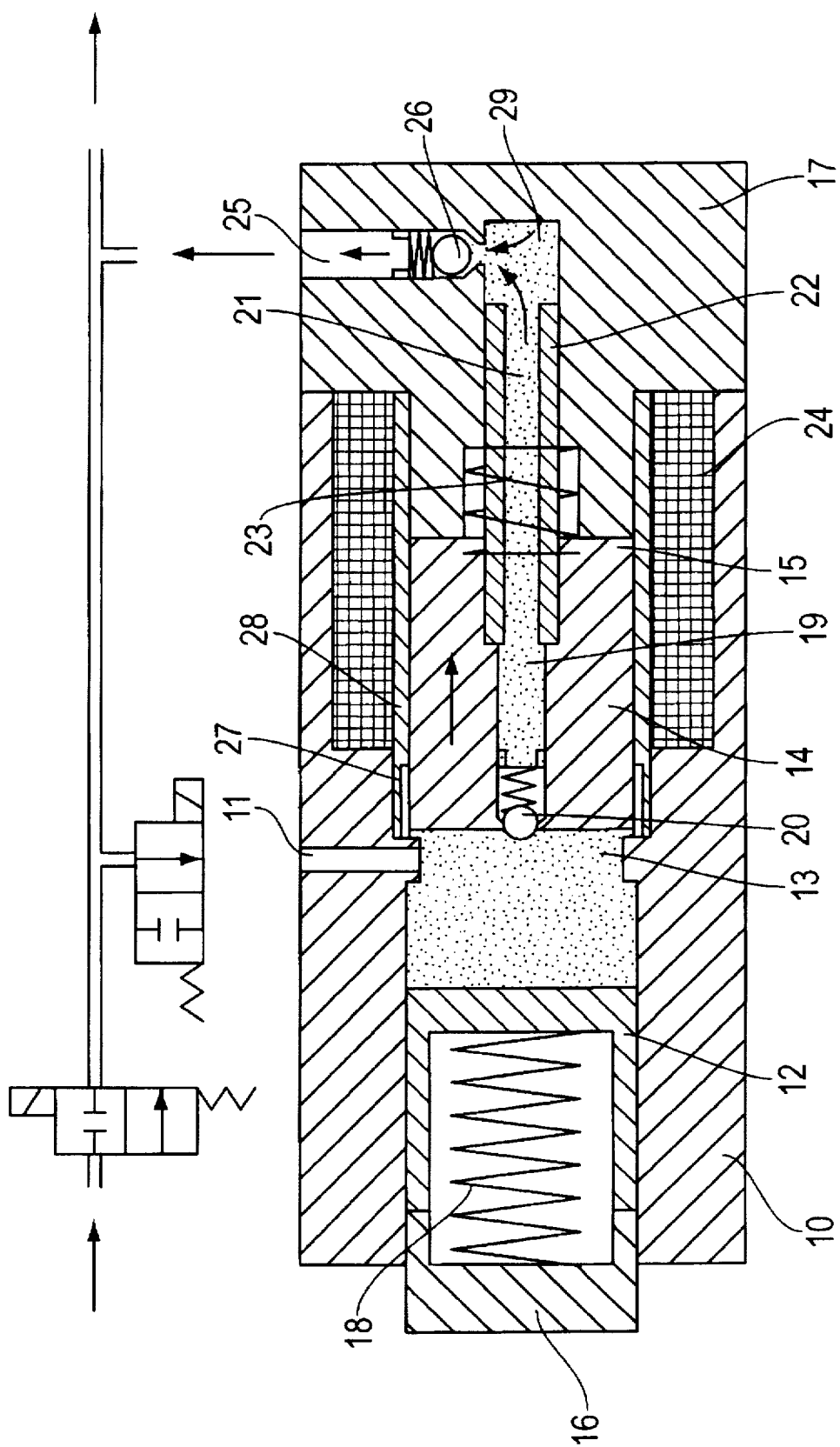
FIG. 8 is a cross-sectional view showing operation of the solenoid pump in accordance with the invention.

As shown in FIG. 8, when the flowing path is opened as the ball of the single direction check valve 26 blocking the flowing path at the side of the discharging port 25 overcomes the elastic force of the spring, the liquid at the side of the compressing chamber 15 is introduced into the brake wheel cylinder through the discharging port 25 of the yoke 17, and the pressure therein is increased, so that the armature 14 moves to the side of the suction chamber 13, and the increased pressure at the side of the compressing chamber 15 is decreased, and the piston 12 moving to the side of the compressing chamber 15 presses the liquid of the suction chamber 13, and thus the pressure at the side of the suction chamber 13 is increased.

Therefore, the pressure of the liquid in the suction chamber 13 is increased by the piston 12, and the compressing liquid serves to open the single direction check valve 20 blocking the passing-through path 19 of the armature 14, and the liquid flows to the side of the compressing chamber 15 and is stored in the compressing chamber 15.

When an electrical signal is applied to the solenoid coil 24, a magnetic field is formed at the solenoid coil 24, and the armature 14 is moved, and the liquid stored in the compressing chamber is discharged through the discharging port 25, so that the charging and discharging operation of the liquid is performed as a pump.

Through the above-mentioned processes, when it is necessary to maintain the pressure of the brake wheel cylinder constant, the controller blocks the electrical signal from the solenoid coil 24, so that the liquid is not discharged anymore, and thus the constant pressure of the brake wheel cylinder is maintained.

When it is necessary to decrease the pressure of the brake wheel cylinder or increase the same, the inlet port 11 is blocked or opened, so that it is possible to prevent the sliding of the wheel by compressing and discharging the liquid in accordance with a certain signal applied to the solenoid coil 24.

When the wheel lock ends while the pressure of the brake wheel cylinder is decreased, the liquid from the brake wheel cylinder flows to the master cylinder due to the pressure difference, and the pressure thereof is recovered, and the liquid of the suction chamber 13 is returned to the master cylinder side.

Since the ABS according to the present invention has one pump for sucking/discharging liquid in cooperation with the reciprocating movement of the armature by the solenoid coil, a more compact size may be achieved, and power consumption is decreased. In addition, the present system results in reduced vibration.

In addition, since a stop member and an armature spring are used, the response ability is good for maintaining pressure without using an elastic member.

When a driver abruptly unlocks the brake in the mode of the sliding prevention operation, the liquid in the suction chamber is introduced into the master cylinder due to the pressure difference without the operation of the solenoid, and it is possible to more easily control the system because the operation speed can be varied by varying the signal frequency irrespective of the polarity of the electrical signal applied to the solenoid coil.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An anti-lock brake system which comprises:
   master cylinders and brake wheel cylinders driven in cooperation with a vacuum/hydraulic booster;
   open-type solenoid valves for supplying an anti-lock braking force generated by the master cylinders to the brake wheel cylinders;
   closed-type solenoid valves for locking the pressure of the brake wheel cylinders, the close-type solenoids being operated during decompression;
   decompressing orifices for determining a decompression level of the closed-type solenoid valves from the brake wheel cylinders;
   liquid storing devices for storing liquid introduced thereto from the decompressing orifices; and
   solenoid pumps for supplying the liquid stored in the liquid storing devices to the brake wheel cylinders and for generating a locking force.

2. The anti-lock brake system according to claim 1 wherein the open-type solenoid valve disposed between the brake wheel cylinder and the master cylinders locks the master cylinder and the brake wheel cylinder when the open-type solenoid valve is changed to a locking position during locking and returns to an open position when an anti-locking operation is completed.

3. The anti-lock brake system according to claim 1 wherein the liquid storing apparatus receives a certain spring elastic force and has a volume which varies within a certain range.

4. The anti-lock brake system according to claim 1, wherein the brake wheel cylinder and the master cylinder include a single direction check valve disposed therebetween for unlocking a locking force of the brake wheel cylinders.

5. The anti-lock brake system according to claim 3 wherein the brake wheel cylinder and the master cylinder include a single direction check valve disposed therebetween for unlocking a locking force of the brake wheel cylinders.

6. The anti-lock brake system according to claim 1 wherein when maintaining a certain locking force pressure of the brake wheel cylinder, operation of the pump is terminated in a short time using a magnet suction force.

7. The anti-lock brake system according to claim 3 wherein the liquid storing device comprises a certain supporting spring elastic force which is greater than that of a supporting spring disposed between a suction portion which uses a magnet suction force and a discharging port.

8. The anti-lock brake system according to claim 4 wherein a charging port of the solenoid pump is connected to the brake wheel cylinder through the solenoid valve, and the discharging port thereof is connected to the brake wheel cylinder and the single direction check valve.

9. The anti-lock brake system according to claim 1 wherein an interior of the solenoid pump comprises a charging port through which liquid introduced from the brake wheel cylinder is partitioned into a suction chamber and a compression chamber, the suction chamber and the compression chamber comprising a piston receiving a certain elastic force of a spring and an armature, and the compression chamber comprising a solenoid coil which generates a certain magnetic field with respect to the armature.

10. The anti-lock brake system according to claim 9 wherein the suction chamber and the compression chamber comprise a cap and a yoke which restrict the movement of the piston and the armature.

11. The anti-lock brake system according to claim 9 wherein an elastic force of the spring supporting the armature is greater than that of the spring supporting the piston.

12. The anti-lock brake system according to claim 10 wherein an elastic force of the spring supporting the armature is greater than that of the spring supporting the piston.

13. The anti-lock brake system according to claim 9 wherein the armature comprises a first single direction check valve for locking/controlling a pass-through path formed in the interior thereof, and the yoke comprises a second single direction check valve for locking/controlling a discharging port communicating with the brake wheel cylinder.

14. The anti-lock brake system according to claim 10 wherein the armature comprises a first single direction check valve for locking/controlling a passing-through path formed in the interior thereof, and the yoke comprises a second single direction check valve for locking/controlling a discharging port communicating with the brake wheel cylinder.

15. The anti-lock brake system according to claim 10 wherein the cap permits a discharge of compressed air in accordance with the movement of the piston and prevents suction of dust or foreign substances.

16. The anti-lock brake system according to claim 1 wherein an elastic force of a spring of the first single direction check valve and an elastic force of a spring of the second single direction check valve are the same.

17. The anti-lock brake system according to claim 13 wherein the armature comprises a bearing disposed at an outer surface thereof for guiding the movement of the armature and a leakage blocking tube inserted into the yoke for blocking a leakage of liquid.

18. The anti-lock brake system according to claim 13 wherein the second single direction check valve is opened when liquid is discharged, and the first single direction check valve is opened when liquid is sucked and the second check valve is closed.

19. The anti-lock brake system according to claim 17 wherein the leakage blocking tube is made of a non-magnetic material.

\* \* \* \* \*